3,454,589
Patented July 8, 1969

3,454,589
PROCESS FOR PREPARATION OF ZINC HALIDE - 2,2' - DITHIOBISBENZOTHIAZOLE AND ZINC HALIDE-2-MERCAPTOBENZOTHIAZOLE COMPLEXES
James Kalil, Wilmington, Del., and James Milano, Erial, N.J., assignors to E. I. du Pont de Nemours and Company, Wilmington, Del., a corporation of Delaware
No Drawing. Filed Aug. 31, 1966, Ser. No. 576,218
Int. Cl. C07d 91/48
U.S. Cl. 260—299    7 Claims

ABSTRACT OF THE DISCLOSURE

A process for the preparation of zinc halide complexes containing either one mole of zinc halide with one mole of 2,2'-dithiobisbenzothiazole or one mole of zinc halide with two moles of 2-mercaptobenzothiazole which consists of blending 2-benzothiazole or 2,2'-dithiobisbenzothiazole with about 70–130 mole percent of the stoichiometric quantity of a zinc halide in an atmosphere having a water content at least in the amount contained in an atmosphere about 50% saturated with water at a temperature of 50° F. and a pressure of 1 atmosphere.

---

This invention relates to complexes of zinc chloride with 2,2'-dithiobisbenzothiazole and with 2-mercaptobenzothiazole, and more particularly to a new method of preparing these complexes by blending the powdered ingredients in the presence of water.

Zinc halides have been found to be highly effective as activating agents in the sulfur curing of polyurethane polymers having side chains containing ethylenic unsaturation. The use of zinc halides as activating agents, however, presents serious problems since these compounds are extremely hygroscopic and highly irritating when in contact with the skin. In order to overcome the difficulties associated with the use of zinc halides in vulcanizing polyurethanes, coordination complexes of zinc halides with 2-mercaptobenzothiazole and 2,2'-dithiobisbenzothiazole have been used as accelerators instead of the free zinc halides. These complexes are high melting, free flowing, substantially non-hygroscopic crystalline powders and do not present as great a hazard to the skin as do the free zinc halides. The use of these complexes in curing sulfur-curable polyalkyleneether polyurethanes is described in U.S. Patent 2,846,416 to Arnold et al.

The zinc chloride/2,2'-dithiobisbenzothiazole and zinc chloride/2-mercaptobenzothiazole complexes and a process for their preparation are described in U.S. Patent 2,868,798 to Kehr. The process described therein involves mixing the ingredients together in an insert liquid suspending medium while subjecting them to abrading conditions, e.g. a ball mill. This process results in complex formation of high quality, however, it is very expensive. It involves the recovery of an inert suspending liquid and the use of equipment which has a limited output in terms of time and size of equipment; all of which means a high cost per pound of finished product. There has been a need in the art therefore, for a method of preparing these important complexes in a direct and more economical manner.

It has been discovered that the complexes of 1 mole of a zinc halide with 1 mole of 2,2'-dithiobisbenzothiazole and 1 mole of a zinc halide with 2 moles of 2-mercaptobenzothiazole may be prepared by blending the components in the presence of a controlled quantity of water. The components are blended in such amounts that either is present in up to about a 30% molar excess of its stoichiometric content in the complex. The zinc halides which may be used in this invention are zinc chloride ($ZnCl_2$), zinc bromide ($ZnBr_2$) and zinc iodide ($ZnI_2$).

In order to form the complexes by the process of this invention, the components must be blended in the presence of some water. The exact amount of water necessary for the formation of the complex is not critical, and may vary over a wide range. However it has been found that the complexes are not formed at a rate to be of significant value unless there is water present during the process in an amount sufficient to allow the components to absorb from about 4–18% of their weight of water during the blending step. The necessary quantity of water can be present in the form of water vapor in the atmosphere or it can be added directly to the components as very small droplets to prevent caking and lumping of the zinc chloride. When the water is in the form of water vapor in the atmosphere, it has been found that the complexes are not formed at a significant rate unless there is water present at least in the amount contained in an atmosphere about 50% saturated with water at a temperature of 50° F. and a pressure of 1 atmosphere. It is especially preferred that the water be added in the form of a mist of very fine droplets in which case the surrounding atmosphere is a two-phase system being saturated with water vapor and in addition containing very fine droplets of water. This method of adding the water results in a faster rate of reaction since the higher the water content of the atmosphere, the more rapid is the rate of formation of the complexes. It is preferable to physically mix the two components thoroughly prior to contacting them with the water to further prevent the zinc halide from lumping.

The temperature at which the blending takes place is not critical. Complex formation takes place readily at room temperature. If the process is performed at a temperature less than 50° F. and the water source is water vapor in the atmosphere, the relative humidity of the atmosphere should be raised above the 50% level to compensate for the reduced water content of the surrounding medium. When operating at room temperature there usually will be some condensation if steam is being used as the components are being blended. At temperatures above 100° C. there is no condensation of moisture, but the mass does pick up water.

The components should be in the form of fine powders when blended to insure better contact and through mixing of the components. Though larger size particles can be used, the 2,2'-dithiobisbenzothiazole, 2-mercaptobenzothiazole and zinc halide preferably are employed in a form such that about 80% by weight of the particles are less than 150 microns at their largest dimension. Optimum results are obtained when about 99% of the 2,2'-dithiobisbenzothiazole and 2-mercaptobenzothiazole particles are less than 150 microns and the zinc chloride particles are 15 microns or less at their largest dimension.

The two components are blended in amounts such that either is present up to about 30 molar percent in excess of its stoichiometric content in the complex. However, for economic reasons, it is preferred that the zinc halide be present from about 10 to 30 mole percent in excess.

Any conventional blending equipment can be used for the manufacture of these complexes. Ribbon blenders are particularly useful. Sigma blade mixers can also be used. It is not necessary to use heavy equipment to effect grinding. The equipment should have a cover to permit maintaining a moist atmosphere over the mass during blending. The length of time over which the components are blended varies with several factors such as the amount of water present, size of particles and degree of conversion of the components to the complex desired; but may be routinely determined by one skilled in the art with reference to the examples which follow. The process may be used to prepare the complexes batch-wise, or it may be modified for continuous production.

Since variable amounts of water will be picked up during the formation of the complex, drying is necessary. Conventional drying, such as in tray dryers, may be used. If the product is lumpy, it may be pulversized, as for example, in a micropulverizer.

The complexes thus formed are free-flowing, relatively non-hygroscopic powders. The 2,2-dithiobisbenzothiazole complex is a rather pale yellow. The powders incorporate easily into elastomer compounding formulations. As illustrated by the following examples, the complexes prepared by the process of this invention exhibit performance practically equivalent to that of high quality complexes prepared by prior art processes. This invention thus provides a simple, direct and inexpensive process for forming complexes which serve as important accelerators in the curing of polyurethanes.

The manner in which the complexes of this invention may be employed in curing sulfur-curable polyalkyleneether polyurethanes is described in U.S. Patent 2,846,416 and is further described in the examples appearing hereinafter. The types, representative examples, and methods of preparation of the polyalkyleneether polyurethanes for which the complexes are valuable in curing are described in U.S. Patents 2,808,391 to Pattison and 2,927,098 to Goldberg.

The following examples will better illustrate the present invention:

A polyalkyleneether polyurethane for use in evaluating zinc halide complexes is made as follows:

Three moles of toluene-2,4-diiscocyanate is added to 1 mole of 3-(allyloxy)-1,2-propanediol and the mixture is agitated for 3 hours at 80° C. under a nitrogen atmosphere. Then 2 moles of polytetramethyleneether glycol, molecular weight 1000, is added and agitation at 80° C. is continued for an additional 1 hour. The mass is transferred to a container with a polyethylene liner and heated in an over for 72 hours. The rubbery polymer obtained has an average of one allyloxy side chain for each 2650 units of molecular weight.

The zinc chloride used in the examples is technical grade. The particles are in the range of 1 to 15 microns at their largest dimension, the majority being in the 1 to 2 micron range.

The 2,2' - dithiobisbenzothiazole and 2 - mercaptothiazole used pass 100% through a Tyler 32 mesh screen and 99% through the 100 mesh screen (.147 mm.).

The Monsanto Rheometer and its use for measuring change of torque during vulcanization are described in an article entitled "An Oscillating Disk Rheometer for Measuring Dynamic Properties During Vulcanization" by G. E. Decker, R. W. Wise, and D. Guerry in "Rubber Chemistry and Technology" 36, 451–8 (1963). The torque measured is a function of the degree of vulcanization of the polyurethane sample.

The para-cumarone-indene resin used in the examples is a product marketed by Allied Chemical Corporation as "Cumar" W 2½.

Throughout the examples, 2,2'-dithiobisbenzothiazole will be represented by MBTS and 2-mercaptobenzothiazole by MBT.

Throughout the examples all quantities of water added are greater than the minimum level necessary previously described herein.

The stress-strain properties of the cured polyurethanes are measured in accordance with ASTM D–412–61T. Shore A hardness is measured according to ASTM D–676–59T.

In the examples, all parts are parts by weight.

EXAMPLE 1

17 lbs. of MBTS and 7.7 lbs. of $ZnCl_2$ (mole ratio $ZnCl_2$/MBTS=1.1:1) are charged into a ribbon blender and thoroughly mixed at room temperature. An air-water mist is then introduced into the upper part of the blender at intervals. The mist is formed using a Model No. 7 Binks spray gun with a No. 36SD spray head. Air is passed through the gun at a rate of 320 liters per minute. The water mist is introduced according to the following schedule:

| Running time-minutes: | Lbs. water added |
| --- | --- |
| 0–5 | 0.7 |
| 8–13 | 0.6 |
| 25–30 | 0.9 |
| 32–37 | 0.7 |
| 127–132 | 0.9 |
| 134–139 | 0.9 |
| Total | 4.7 |

During this time the mixture gradually turns from a gray color to yellow. The product is removed from the blender and weighs 28.9 lbs., showing a pickup of 4.2 lbs. or 17% water. It is dried in an oven at 50° C. The complex thus formed is substantially non-hygroscopic and is readily incorporated into the polyurethane stock described below.

The properties of a stock prepared by incorporating the complex of this example into the polyurethane prepared as described above are illustrated in Sample 1 below. For comparison purposes a high quality complex made according to Example 3 of U.S. Patent 2,868,798 is tested under the same conditions (Sample 2). The stock is compounded according to the following recipe:

| | Parts by wt. |
| --- | --- |
| Polyalkyleneether polyurethane | 100 |
| HAF carbon black | 30 |
| Para-cumarone-indene resin | 15 |
| MBTS | 4 |
| MBT | 1 |
| Cadmium stearate | 0.5 |
| Sulfur | 0.75 |
| MBTS/$ZnCl_2$ complex | 0.35 |

The stocks are tested in the Monsanto Rheometer at 310° F. Torque values in time are shown in the table below:

| Time, minutes | Torque, inch-pounds | |
| --- | --- | --- |
| | Sample 1 | Sample 2 [1] |
| 5 | 4 | 4 |
| 10 | 14 | 13 |
| 15 | 62 | 58 |
| 20 | 69 | 70 |
| 25 | 70 | 73 |

[1] Outside scope of invention, included for comparison purposes only

EXAMPLE 2

358 lbs. of MBTS and 162.5 lbs. of $ZnCl_2$ (mole ratio $ZnCl_2$/MBTS=1.1:1) are charged into a covered stainless steel, jacketed ribbon blender approximately 42 in. x 45 in. x 84 in. driven by a 15 h.p. motor. The blender is run for one hour to thoroughly mix the components. While mixing is continued, a fine spray of 93.7 lbs. deionized water is introduced continuously and uniformly into the blender over a period of 2 hours. After the water is all added, any material adhering to the walls is scraped down into the main mass. The blender is then started up and 25 p.s.i. steam is put on the jacket for about 16 hours after which a sweep of air is drawn through the blender to dry the MBTS/$ZnCl_2$ complex to a moisture content of less than 1%. The material is ground to a powder in a micropulverizer and the resultant yellow complex has a melting point of 246° C., volatile 0.74%, Zn 13.9%, Cl 16.2%. It is substantially non-hygroscopic and is easily incorporated into the polyurethane formulation described below. The use of the complex in curing the polyalkyleneether polyurethane stock is illustrated below in Sample 1. For comparison purposes a high quality complex prepared by the process of Example 3 of U.S. Patent 2,868,798 is tested under the same conditions (Sample 2). The polyurethane is compounded as follows:

| | Parts by wt. |
|---|---|
| Polyurethane | 100 |
| HAF carbon black | 30 |
| Para-cumarone-indene resin | 15 |
| MBTS | 4 |
| MBT | 1 |
| Cadmium stearate | 0.5 |
| Sulfur | 0.75 |
| MBTS/ZnCl$_2$ complex | 0.35 |

| Mooney scorch, 250° F. | Sample 1 | Sample 2 [1] |
|---|---|---|
| Minimum | 30 | 31 |
| Minutes to 10 pt. rise | >45 | >45 |

After a 30 minute cure at 287° F., the compounded polyurethane has the following properties:

| | Sample 1 | Sample 2 [1] |
|---|---|---|
| Modulus at 300% elongation, lbs./sq. in | 2,100 | 2,150 |
| Tensile strength at break, lbs./sq. in | 5,850 | 5,100 |
| Elongation, percent | 540 | 510 |
| Hardness, Shore A | 63 | 66 |

[1] Outside scope of invention, included for comparison purposes only.

EXAMPLE 3

10 parts of a mixture of ZnCl$_2$ and MBTS in a molar ratio of 1.1:1.0 is blended in a practically water-saturated atmosphere formed by mixing streams of steam and air. The mass gradually changes from gray to deep yellow after about 20 minutes. A weight gain of 1.46 parts shows a water pick-up of 14.6%. The melting point range of the complex is 240–246° C. and it is substantially non-hygroscopic. The use of the complex in the polyalkyleneether polyurethane stock is illustrated below (Sample 1). For comparison purposes, the complex of Example 3 of U.S. Patent 2,868,798 is tested under the same conditions (Sample 2). The polyurethane is compounded as follows:

| | Parts by wt. |
|---|---|
| Polyalkyleneether polyurethane | 100 |
| HAF carbon black | 30 |
| Para-cumarone-indene resin | 15 |
| MBTS | 4 |
| MBT | 1 |
| Cadmium stearate | 0.5 |
| Sulfur | 0.75 |
| ZnCl$_2$/MBTS complex | 0.35 |

The stocks are tested in the Monsanto Rheometer, results are as shown below:

| | Torque, inch-pounds | |
|---|---|---|
| Time, minutes | Sample 1 | Sample 2 [1] |
| 5 | 4 | 4 |
| 10 | 30 | 23 |
| 15 | 72 | 72 |
| 20 | 75 | 74 |
| 25 | 74 | 74 |

[1] Outside scope of invention, included for comparison purposes only

EXAMPLE 4

Zinc chloride and MBTS are thoroughly mixed to form a homogeneous mixture in a molar ratio of 1.1:1.0.

(a) 22 parts of the gray mixture is placed in a vessel, heated to 85° C., and immersed in a steam-saturated atmosphere while the mixture is slowly stirred. After 10 minutes the mass turns to the yellow color of the complex. It has gained 1.2 parts by weight which is a moisture pick-up of 5.46%. The complex is substantially non-hygroscopic.

(b) Another portion of 24.7 parts of the gray mixture is placed in a vessel and heated to 125° C. and a stream of steam-saturated nitrogen is passed through the vessel while the mass is slowly agitated. At the end of 10 minutes the mass has turned to the yellow color of the complex and has gained 1.6 parts which is a water pick-up of 6.48%. The complex is substantially non-hygroscopic.

EXAMPLE 5

(a) 7.7 parts of zinc chloride and 17 parts of MBT (mole ratio of ZnCl$_2$ to MBT=2.0:1) are thoroughly blended. The mixture is then stirred for 20 minutes in an atmosphere saturated with steam. The grayish mass gradually turns to a light yellow. The resulting product (Sample 1) is dried in a vacuum oven. The complex is substantially non-hygroscopic and readily incorporates into the polyurethane stock described below.

(b) For comparison purposes a sample of

ZnCl$_2$·2MBT complex is made for testing as follows:

10.75 parts of ZnCl$_2$ is added to 169 parts of acetone in a vessel equipped with agitation and a reflux condenser. Then 26 parts of MBT is added. The reaction mass is heated to 57° C. for 50 minutes. The acetone refluxes gently. The temperature is then lowered to 25° C. The yellow precipitated ZnCl$_2$·2MBT complex (Sample 2) is filtered off and dried.

Each of the two samples 1 and 2 is compounded with the polyurethane using the formulation of Example 1. The compounded stocks are tested in the Monsanto Rheometer at 310° F. with the results shown below:

| | Torque, inch-pounds | |
|---|---|---|
| Time, minutes | Sample 1 | Sample 2 [1] |
| 5 | 4 | 4 |
| 10 | 20 | 22 |
| 15 | 69 | 69 |
| 20 | 77 | 76 |
| 25 | 77 | 76 |

[1] Outside scope of invention, included for comparison purposes only.

The Mooney Scorch at 250° F. to a 10 point rise is 34 minutes for both of the samples.

EXAMPLE 6

33.2 parts by weight of MBTS and 22.5 parts by weight of ZnBr$_2$ are blended for 20 minutes while a steam-air mixture containing water in excess of 50% saturation is passed over the agitated mass. No external heat is applied. The mixture turns from a light buff color to a uniform medium yellow color during this time. The mass gained 3.5 parts in weight which corresponds to a water pick-up of 6.3%.

The MBTS·ZnBr$_2$ complex has practically the same effect as an accelerator in the cure of sulfur-curable polyurethanes as the MBTS·ZnCl$_2$ complex prepared in Example 1.

Examples 1, 2, 3 and 5 illustrate that in each instance where complexes prepared by the process of this invention are compared with high quality complexes prepared by prior art processes, substantially equivalent performance is observed.

What is claimed is:

1. A process for the preparation of a zinc halide complex selected from the group consisting of those containing one mole of zinc halide with one mole of 2,2-dithiobisbenzothiazole and one mole of zinc halide with 2 moles of 2-mercaptobenzothiazole which consists essentially of blending an organic compound of the group consisting of 2-mercaptobenzothiazole and 2,2'-dithiobisbenzothiazole with about 70–100 mole percent of the stoichiometric quantity of a zinc halide of the group consisting of zinc chloride, zinc bromide, and zinc iodide in an atmosphere having a water content at least in the amount contained in an atmosphere about 50% saturated with water at a temperature of 50° F. and at the pressure of 1 atmosphere.

2. The process of claim 1 wherein the quantity of water is sufficient to allow the components to absorb from about 4–18% of their combined weight of water during the blending step.

3. The process of claim 2 wherein the zinc halide is zinc chloride.

4. The process of claim 2 wherein the water is added in the form of a mist of very fine water droplets.

5. The process of claim 4 wherein the zinc halide is present in an amount about 10 to 30% in excess of its stoichiometric content in the complex.

6. The process of claim 4 wherein the zinc halide is zinc chloride.

7. The process of claim 4 wherein the 2,2'-dithiobisbenzothiazole and 2-mercaptobenzothiazole are in the form of particles 99% by weight of which are less than 150 microns at their largest dimension and the zinc halide is zinc chloride in the form of particles not greater than about 15 microns at their largest dimension, said zinc chloride being present in the amount of about 10–30% molar excess of its stoichiometric content in the complexes.

References Cited

UNITED STATES PATENTS

| | | | |
|---|---|---|---|
| 2,754,303 | 7/1956 | Harman | 260—299 |
| 2,868,798 | 1/1959 | Kehr | 260—299 |
| 3,043,847 | 7/1962 | Wilde | 260—299 |

ALEX MAZEL, *Primary Examiner.*

R. J. GALLAGHER, *Assistant Examiner.*

U.S. Cl. X.R.

260—858, 78